Aug. 1, 1967  C. B. ASKE, JR  3,333,900
VEHICLE WHEEL TRIM
Filed April 7, 1965  2 Sheets-Sheet 1

INVENTOR.
CHARLES B. ASKE JR.
BY
ATTORNEY

Aug. 1, 1967

C. B. ASKE, JR 3,333,900

VEHICLE WHEEL TRIM

Filed April 7, 1965

INVENTOR.
CHARLES B. ASKE JR.
BY
ATTORNEY

United States Patent Office 3,333,900
Patented Aug. 1, 1967

3,333,900
VEHICLE WHEEL TRIM
Charles B. Aske, Jr., Birmingham, Mich., assignor, by direct and mesne assignments, to Gar Wood Industries, Inc., a corporation of Michigan
Filed Apr. 7, 1965, Ser. No. 446,294
4 Claims. (Cl. 301—37)

This invention relates to improvements in vehicle wheel trim. The vehicle wheel trim of the instant invention encompasses and includes a highly desirable and economical overall wheel cover and rim trim assembly which is readily and positively mounted as a unit on a conventional motor vehicle wheel, and which can be conveniently and easily removed as a unit from the vehicle wheel when and as required.

Accordingly, the primary object of the instant invention is to provide improved and economical wheel trim assembly for motor vehicle wheels whereby the difficulty of mounting and demounting separate wheel trim elements is avoided, which wheel trim assembly includes an improved and relatively simple and effective interengagement and assembly of wheel trim, rim trim and anchorage elements used in a novel combination to produce both a positive anchorage of the wheel trim assembly on a vehicle wheel and a highly desirable overall aesthetic appearance of a vehicle wheel.

A further object of the invention is to provide simple and effectively assembled means for trimming a conventional motor vehicle wheel employing a wheel cover, rim trim and anchorage means wherein the wheel cover element may be of plastic or other suitable material and wherein the wheel cover and rim trim are completely rubber mounted or otherwise resiliently cushioned with respect to each other and the vehicle wheel whereby to eliminate wheel cover noises and ratcheting with respect to the vehicle wheel, and to allow for the usual high differential in the expansion and contraction between the plastic wheel cover and the vehicle wheel.

Other objects of the invention directed toward economy in cost, positive and reliable function, and desirability in results will become apparent by reference to the following description taken in connection with the accompanying drawings, in which.

Figures 1, 2, 3:
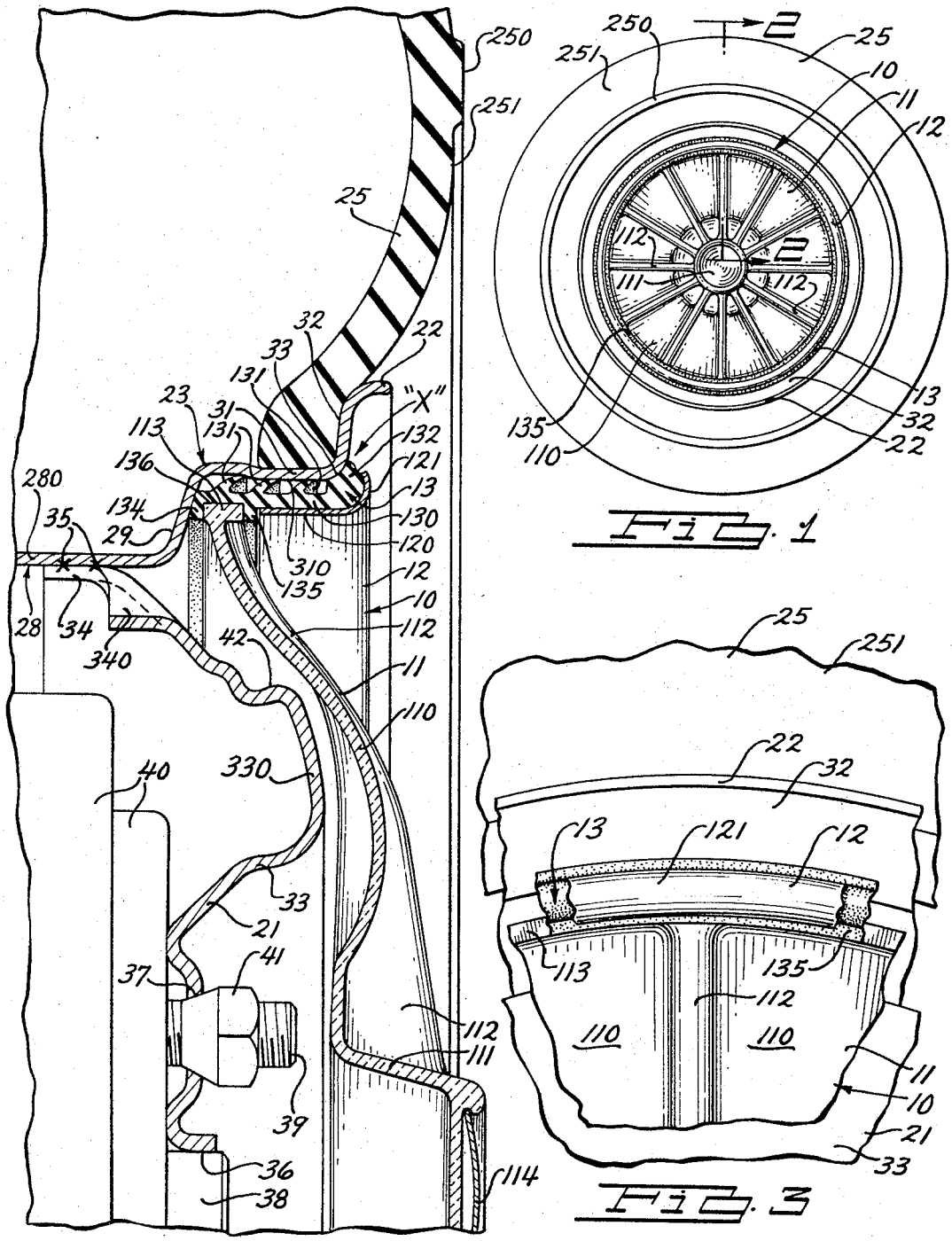
FIG. 1 is a side elevational view of a vehicle wheel and tire having mounted thereon a combined vehicle wheel cover and wheel rim trim embodying the invention.
FIG. 2 is an enlarged fragmentary sectional view taken on the line 2—2 of FIG. 1.
FIG. 3 is an enlarged fragentary elevational view with parts broken away of the wheel cover and wheel trim disclosed in FIGS. 1 and 2.

Referring now to the drawings wherein like reference characters refer to like and corresponding parts throughout the several views, the particular embodiment of the invention disclosed in FIGS. 1, 2 and 3 comprising a vehicle wheel cover and wheel trim assembly 10 consisting of a wheel cover element 11, a wheel rim trim element 12 and an anchorage element 13, the said wheel cover 11, rim trim 12 and anchorage element 13 being interengaged to provide complete rubber cushioning of the wheel cover 11 and rim trim 12 with respect to each other when assembled into the wheel cover and wheel trim assembly 10, also being completely rubber cushioned with respect to the vehicle wheel 21 on which it is conveniently mounted.

The vehicle wheel 21 is of a conventional type and is shown in the drawings with a tubeless tire 25 mounted thereon. The said vehicle wheel 21 has the usual drop center rim 23 composed of a central channel or drop center 28 having side walls 29 and a base 280. An annular tire bead seat 31 extends laterally outwardly from each side of the side walls 29 of the drop center 28, each said tire bead seat 31 terminating in a tire bead seat flange 32 extending radially therefrom which is axially outwardly curved at its upper portion to form an axially disposed outer lip 22. The said tire bead seat flange 32 is ofttimes referred to as the wheel flange and the said lip 22 is ofttimes referred to as the lip of the wheel rim. Within the drop center rim 23 is a wheel spider 33 having an axially disposed flange 34 which is secured to the central channel 28 of the drop center rim 23 by such means as welding at 35. The said wheel spider 33 is provided with a central hub aperture 36 with securing stud holes 37 spaced therearound to accommodate respectively the wheel hub 38 and wheel securing studs 39 extending from the brake drum 40 to which the wheel 21 is secured by means of the usual wheel securing nuts 41.

The flange 34 of the spider 33· is generally scalloped out and formed at 340 at intervals around the periphery thereof to provide brake drum ventilation and added structural strength to the vehicle wheel 21. The spider 33 is usually formed with an annular axially outwardly extending reinforcing collar 330 which is generally provided with a plurality of hub cap retainer nubs 42 over which a conventional hub cap (not shown) is normally sprung for securement onto the vehicle wheel 21. However, because the wheel trim assembly 10 covers substantially the entire wheel, no hub cap is used when a vehicle wheel is trimmed with wheel trim of the instant invention. The vehicle wheel manufacturer nevertheless paints the vehicle wheels 21 in a conventional manner so that the purchaser of the motor vehicle may have a choice of available wheel trim.

The particular tire 25 illustrated in the drawings is a modern tubeless tire having a scuff bead 250 extending from its side wall 251. The said tubeless tire 25, when used on the vehicle wheel 21, requires a conventional valve stem (not shown) mounted in sealed relationship through a suitable valve stem aperture (not shown) generally provided in the outer side wall 29 of the drop center rim channel 28 of the rim 23 of the said wheel 21. The wheel trim 10 of the invention is also suitably apertured (not shown) to accommodate the said valve stem so that it is always available for inflation or deflation of the tire.

The particular embodiment of the wheel trim assembly 10 of the invention disclosed in FIGS. 1, 2 and 3 consists of three elements; namely, a generally disc shaped relatively rigid wheel cover element 11, a generally axially disposed annular rim trim eement 12, and a generally axially disposed annular toothed anchorage element 13, all of which are assembled into an interengaged and interlocked vehicle wheel trim assembly 10 prior to mounting the said assembly on a vehicle wheel 21 with the toothed portion of the anchorage element 13 telescoped within the inner annulus 310 of the tire bead seat 31 of the said vehicle wheel 21, all as best shown in FIG. 2. In the assembly of the said wheel cover, rim trim and anchorage elements, the said anchorage element is tensioned over the outer peripheries of the wheel cover and rim trim elements.

The wheel cover element 11 is preferably formed or molded of a suitable relatively rigid yet not brittle plastic to include an axially outwardly facing central disc portion 110 suitably contoured to avoid contact with the wheel spider 33 and preferably ornamented with such means as a central hub 111 and/or wheel spoke simulating ridges 112 or the like. The outer periphery of the central disc portion 110 of thew heel cover element 11 is provided with an axially disposed circumferential outer flange 113 while the central hub 111 thereof has space provided in the axialy disposed face thereof to accommodate a suitable ornamental medallion 114. It is obvious that the said madallion 114 may be formed in the face of the said hub 111 rather than employing a separate element for the purpose.

The annular rim trim element 12 consists of an annular axially disposed band 120 preferably of stainless steel, but, for example, could be of cold rolled steel suitably painted or baked enamel, or could be of polished or anodized aluminum. The radially disposed annular outer portion 121 of the said rim trim element 12 is preferably curved or bull-nosed to conform to the axially facing outer bead portion 132 of the anchorage element 13 hereinafter described in detail.

The annular anchorage element 13 is preferably formed of a resilient rubber extrusion which is cut to the proper length and vulcanized or otherwise secured into an annulus or ring. The said annular anchorage element 13 consists of a base portion 130 having a plurality, preferably three, axially spaced circumferential relatively thin integrally formed radially outwardly disposed flexible anchorage teeth 131, and an axially outwardly facing bead portion 132 formed with an arcuate seat at 133 to seat against the juncture of the annular tire bead seat 31 and the tire bead seat flange 32 of the drop center rim 23 of the vehicle wheel 21 when the wheel and tire trim assembly 10 is mounted thereon as best shown in FIG. 2. The base portion 130 of the said annular anchorage element 13 is provided with a radially inwardly disposed circumferential stop 134 at the axial inner end thereof and a second radially inwardly disposed circumferential stop 135 spaced outwardly from said stop 134 forming a reentrant channel 136 to receive the outer circumferential flange 113 of the wheel cover 11 when the said anchorage element 13 is assembled onto said outer circumferential flange 113. The said radially outer circumferential anchorage teeth 131 of the annular anchorage member 13 are preferably spaced so that at least one anchorage tooth 131 is located substantially axially central of the outer circumferential flange 113 of the wheel cover 13, and the remaining radially outer circumferential anchorage teeth 131 of the anchorage member 13 are spaced axially outwardly from said one anchorage tooth 131 and are located circumferentially outwardly of the annular axially disposed band 120 of the rim trim element 12 when both the said wheel cover 13 and the rim trim element 12 have the annular anchorage element 111 assembled thereonto as shown in FIG. 2.

The wheel trim assembly 10 is completely preassembled prior to the placement thereof on a vehicle wheel 21. It is pointed out that the outer diameter of the annular axially disposed band 120 of the rim trim element 12 and the outer diameter of the outer flange 113 of the wheel cover element 11 are such as to receive thereover in firm contact therewith the inner periphery of the base portion 130 of the annular anchorage element 13. Prior to mounting the wheel trim assembly 10 on a vehicle wheel 21 the upper portion of the anchorage teeth 131 stand upright with the outer diameter of the tips thereof being slightly greater than the inner diameter of the inner annulus 310 tire bead seat 31 of the vehicle wheel 21.

With such construction, the wheel trim assembly 10 consisting of the wheel cover element 11, wheel rim trim element 12 and anchorage element 13 is mounted on the vehicle wheel 21 by axially pressing the said wheel trim assembly 10 axially inwardly to refusal within the inner annulus 310 of the tire bead seat 31 thereof, see FIG. 2. When mounting the said wheel trim assembly 10 on a vehicle wheel 21, the anchorage teeth 131 of the anchorage element 13 flex axially outwardly as best shown in FIG. 2, providing easy mounting but firm anchorage of the entire wheel trim assembly 10 on the vehicle wheel 21. To remove the wheel trim assembly 10 from a vehicle wheel 21, a gentle prying of the wheel trim assembly 10 progressively at intervals therearound is all that is required. This is accomplished by placing a relatively wide screwdriver or other blunt prying device at X between the axially outer annular bead portion 132 of the annular anchorage element 13 and the juncture of the tire bead seat 31 and tire bead flange 32 of the drop center rim 23 of the vehicle wheel 21.

Inasmuch as the total weight of an entire wheel trim assembly 10 of the invention is only approximately 2¼ to 2½ pounds when a plastic wheel cover element 11 is employed, the anchorage teeth 131 of the anchorage element 13 may be relatively thin and flexible providing ease in mounting the wheel trim assembly 10 on and removing it from a vehicle wheel 21. At the same time, because the said anchorage teeth 131 must flex axially inwardly from their position shown in FIG. 2 before removal of the wheel trim assembly 10 from a vehicle wheel 21, the said wheel trim assembly 10 will remain properly positioned on a vehicle wheel 21 withstanding all wheel shocks encountered during the normal driving of a vehicle which has its wheels trimmed by wheel trim of the invention.

Figure 4:
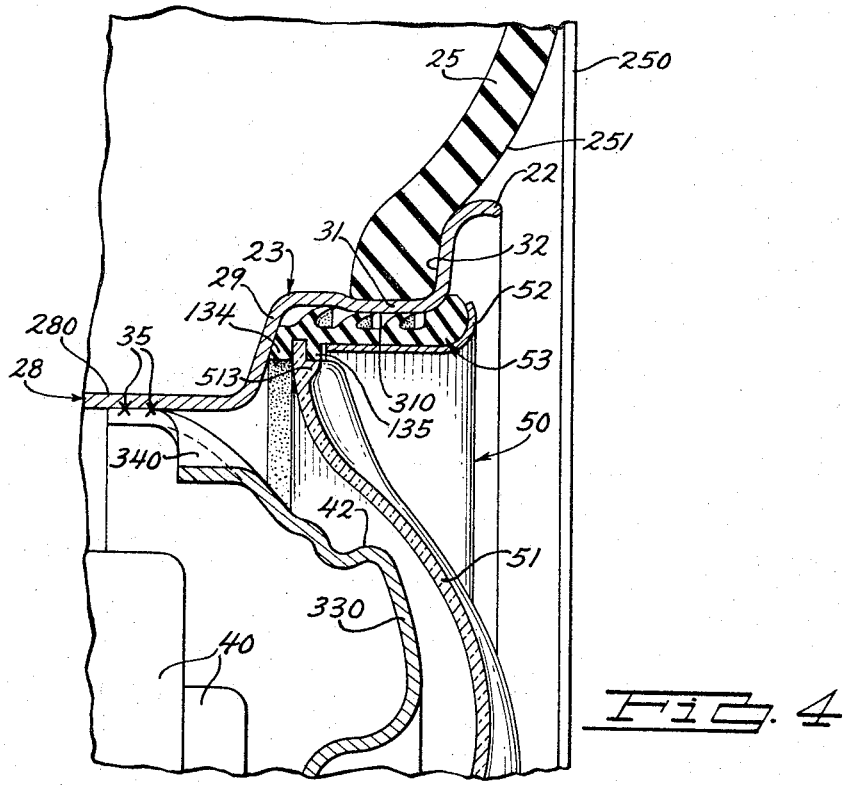
FIG. 4 is an enlarged fragmentary sectional view similar to FIG 2 showing an alternate embodiment of the invention.

The alternate embodiment of wheel and rim trim assembly 50 disclosed in FIG. 4 is like and similar to the embodiment of the invention 10 shown in FIGS. 1, 2 and 3, and hereinbefore described in detail, except that the wheel and rim trim assembly 50 has its wheel cover element 51, its rim trim element 52 and its anchorage element 53 proportioned differently to provide greater axial depth of the rim trim element 52 and a narrower and deeper anchorage of the outer circumferential flange 513 of the wheel cover element 51, the said outer circumferential flange 513 preferably being L-shaped as shown in FIG. 4. Otherwise, the said wheel and rim trim 50 shown in FIG. 4 is substantially the same as the embodiment of the invention shown in detail in FIG. 2.

Figure 5:
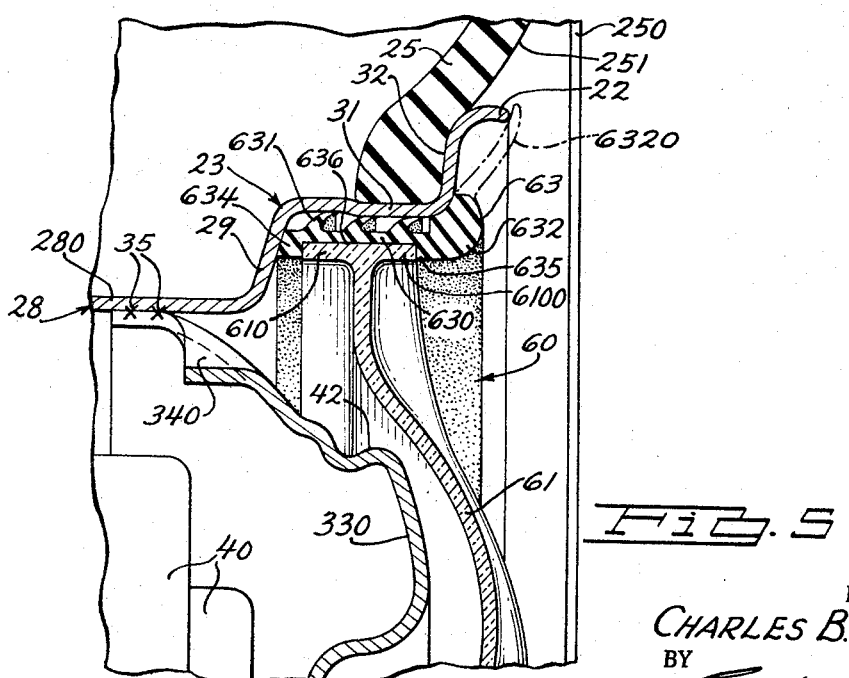
FIG. 5 is an enlarged fragmentary sectional view similar to FIG. 4 showing another alternate embodiment of the invention.

Referring now to FIG. 5, the alternate embodiment of the invention 60 disclosed therein is like and similar to the embodiments of the invention shown in FIGS. 1, 2 and 3, and in FIG. 4, except that, in the wheel rim trim assembly 60, the outer flange 610 of the wheel cover element 61 has been made sufficiently wide to also serve as a rim trim element. In the embodiment of the invention disclosed in FIG. 5, the base portion 630 of the anchorage element 63 is provided with a radially inwardly disposed circumferential stop 634 at the axial inner end thereof while the axially outwardly disposed bead portion 632 thereof is formed sufficiently thick to provide a second radially inwardly disposed circumferential stop 635 spaced axially outwardly from said stop 634 forming a channel 636 to receive the circumferential outer flange 610 of the wheel cover 61 which also serves as a rim trim element at 6100. Otherwise, the said wheel and rim trim 60 shown in FIG. 5 is substantially the same as the other embodiments of the invention herein disclosed and described, and employs anchorage teeth 631 on the base portion 630 of the anchorage element 63 in a manner similar to the anchorage teeth 131 shown in FIG. 2.

The dot and dash lines 6320 in FIG. 5 indicate how the axially outwardly disposed bead portion 632 of the anchorage element 63 may be extended to cover the tire bead seat flange 32 of the wheel rim 23 up to and including the lip 22 of the said wheel rim 23. By so forming the anchorage element 63 of white or other colored rubber or synthetic rubber, a highly desirable simulated white or other colored side wall effect for the tire 25 can be provided at very little cost over the cost of the vehicle wheel and rim trim 60 of the invention. This extension 6320 of the bead portion 632 of the anchorage element 63 of course may be employed with and applied to the embodiments of the invention disclosed in FIGS. 1, 2 and 3, and in FIG. 4.

Although but several embodiments of the invention have been disclosed and described herein, it is obvious that many changes may be made in the size, shape, arrangement and detail of the various elements of the invention, all as set forth in the appended claims.

I claim:
1. A vehicle wheel trim comprising wheel cover and rim trim assembly for vehicle wheels of the type including a wheel spider and a wheel rim having in said wheel rim an axially disposed tire bead seat annulus, said vehicle wheel trim comprising, in combination,
   a plastic wheel cover element, a rim trim element and a resilient annular anchorage element interengaged with each other with the said resilient anchorage element tensioned over said wheel cover and rim trim elements forming said wheel cover and rim trim assembly,
   the said vehicle wheel cover and rim trim assembly being removably mountable on a vehicle wheel with the anchorage element thereof disposed in sole telescoping anchorage engagement within the tire bead seat annulus of said vehicle wheel, and said wheel cover and said rim trim being axially spaced at said anchorage means and completely resiliently cushioned by said anchorage means with respect to each other and said vehicle wheel.

2. A vehicle wheel trim comprising wheel cover and rim trim assembly for vehicle wheels of the type including a wheel spider and a wheel rim having in said wheel rim an axially disposed tire bead seat annulus, said vehicle wheel trim comprising, in combination,
   a plastic wheel cover element, a rim trim element and a resilient annular anchorage element interengaged with each other with the said resilient anchorage element tensioned over said wheel cover and rim trim elements providing said wheel cover and rim trim assembly,
   said anchorage element having a pair of axially spaced radially inwardly extending circumferential stops thereon holding said wheel cover element in the desired predetermned axial location,
   the said vehicle wheel cover and rim trim assembly being removably mountable on a vehicle wheel with the anchorage element thereof in sole telescoping anchorage engagement within the tire bead seat annulus of said vehicle wheel, and
   said wheel cover and said rim trim being completely resiliently cushioned by said anchorage means with respect to each other and said vehicle wheel.

3. A vehicle wheel trim comprising wheel cover and rim trim assembly for vehicle wheels of the type includng a wheel spider and a wheel rim having in said wheel rim an axially disposed tire bead seat annulus, said vehicle wheel trim comprising, in combination,
   a plastic wheel cover element, a rim trim element and a resilient annular anchorage element interengaged with each other with the said resilient anchorage element tensioned over said wheel cover and rim trim elements forming said wheel cover and rim trim assembly,
   said wheel cover element having a generally axially disposed circumferential flange bearing on the inner periphery of said anchorage element,
   said anchorage element having a reentrant channel therein receiving the outer periphery of the wheel cover element at said outer circumferential flange thereof,
   said anchorage element including a plurality of integral axially spaced circumferentially disposed outer flexible anchorage teeth capable of flexing to accommodate differentials in the inner diameter of the tire bead seat annulus and the outer diameter of the plastic wheel cover element,
   the said vehicle wheel cover and rim trim assembly being removably mountable on a vehicle wheel with the anchorage element thereof in sole telescoping anchorage engagement within the tire bead seat annulus of said vehicle wheel, and
   said wheel cover and said rim trim being completely resiliently cushioned by said anchorage element with respect to each other and said vehicle wheel.

4. A vehicle wheel trim as claimed in claim 3 wherein at least one of the anchorage teeth of said anchorage element is radially disposed substantially central of the outer generally axially disposed circumferential flange of the wheel cover element.

References Cited
UNITED STATES PATENTS

| | | | |
|---|---|---|---|
| 2,736,610 | 2/1956 | Waite | 301—37 |
| 2,812,215 | 11/1957 | Waite | 301—37 |
| 2,996,335 | 8/1961 | Aske | 301—37 |
| 3,048,445 | 8/1962 | Shoemaker | 301—37 |
| 3,078,125 | 2/1963 | Aske | 301—37 |
| 3,265,441 | 8/1966 | Baldwin | 301—37 |

FOREIGN PATENTS 1,061,278  11/1953  France.

BENJAMIN HERSH, *Primary Examiner.*

R. J. JOHNSON, *Assistant Examiner.*